(12) United States Patent
Itou

(10) Patent No.: US 11,444,500 B2
(45) Date of Patent: Sep. 13, 2022

(54) MOTOR

(71) Applicant: NIDEC COPAL CORPORATION, Tokyo (JP)

(72) Inventor: Hidenobu Itou, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 250 days.

(21) Appl. No.: 16/747,554

(22) Filed: Jan. 21, 2020

(65) Prior Publication Data

US 2020/0274407 A1  Aug. 27, 2020

(30) Foreign Application Priority Data

Feb. 25, 2019 (JP) .............................. JP2019-031507

(51) Int. Cl.

| H02K 1/2753 | (2022.01) |
|---|---|
| H02K 1/2786 | (2022.01) |
| H02K 29/03 | (2006.01) |
| H02K 21/22 | (2006.01) |
| H02K 1/2733 | (2022.01) |
| H02K 1/2787 | (2022.01) |
| H02K 1/27915 | (2022.01) |

(Continued)

(52) U.S. Cl.
CPC ......... *H02K 1/2753* (2013.01); *H02K 1/2733* (2013.01); *H02K 1/2788* (2022.01); *H02K 1/27915* (2022.01); *H02K 15/03* (2013.01); *H02K 29/03* (2013.01); *H02K 1/2786* (2013.01); *H02K 1/2787* (2022.01); *H02K 21/22* (2013.01); *H02K 2201/03* (2013.01)

(58) Field of Classification Search
CPC .. H02K 1/2787; H02K 1/2788; H02K 1/2789; H02K 1/279; H02K 1/27915; H02K 1/2792

See application file for complete search history.

(56) References Cited

FOREIGN PATENT DOCUMENTS

| JP | 2000308291 | | 11/2000 | |
|---|---|---|---|---|
| JP | 2008312284 | A * | 12/2008 | ........... H02K 1/2733 |
| JP | 2015177637 | A * | 10/2015 | ............... H02K 3/18 |

(Continued)

OTHER PUBLICATIONS

Machine Translation of JP 2008312284 A (Year: 2008).*
Machine Translation of JP 2015177637 A (Year: 2015).*

*Primary Examiner* — Naishadh N Desai
*Assistant Examiner* — Christopher Stephen Schaller
(74) *Attorney, Agent, or Firm* — JCIP Global Inc.

(57) ABSTRACT

A motor with a permanent magnet is provided. A motor has a rotor and an annular drive magnet surrounding the rotor. The drive magnet includes a plurality of magnetized areas having an entire circumference divided into a multiple of at equiangular intervals and includes a plurality of divided areas having an entire circumference divided into the same number as the number of magnetized areas at equiangular intervals. The two adjacent magnetized areas have different polarities. In an inner circumferential surface of each divided area in the drive magnet, a distance D from a rotation center line of the rotor becomes longer from a center in a circumferential direction toward both ends of the area. A magnetization polarization line of the two adjacent magnetized areas deviates from a boundary between the two adjacent divided areas in the circumferential direction.

12 Claims, 7 Drawing Sheets

(51) Int. Cl.
*H02K 1/2788* (2022.01)
*H02K 15/03* (2006.01)

(56) References Cited

FOREIGN PATENT DOCUMENTS

RU          2334342 C2 *  9/2008  ........... H02K 1/2733
WO    WO-2015129549 A1 *  9/2015  ........... H02K 1/2733

* cited by examiner

MOTOR

CROSS-REFERENCE TO RELATED APPLICATION

This application claims the priority of Japan patent application serial no. 2019-031507, filed on Feb. 25, 2019. The entirety of the above-mentioned patent application is hereby incorporated by reference herein and made a part of this specification.

BACKGROUND

Technical Field

The disclosure relates to a motor.

Description of Related Art

Patent Document 1 discloses an electric motor having an annular permanent magnet and armatures disposed on an inner side of the permanent magnet. The permanent magnet has a plurality of magnetic pole parts around an axis of rotation, and the magnetic pole parts are magnetized in the radial direction of rotation of a rotor. The magnetic pole parts adjacent in the rotation direction of the rotor have different polarities. Magnetization of the permanent magnet is skew magnetization tilting in the rotation direction with respect to the axis of rotation. In Patent Document 1, cogging torque of the electric motor is reduced by causing magnetization of the permanent magnet to tilt.

Patent Documents

[Patent Document 1] Japanese Patent Laid-Open No. 2000-308291

Cogging torque needs to be reduced to drive a motor with high accuracy. However, manufacturing a permanent magnet with skew magnetization is more difficult than manufacturing a permanent magnet with magnetization parallel to an axis of rotation. Thus, a motor with a permanent magnet with skew magnetization for reducing cogging torque has a problem of being unsuitable for mass production.

SUMMARY

A motor according to an embodiment of the disclosure has a rotor and an annular drive magnet surrounding the rotor, the drive magnet includes a plurality of magnetized areas having an entire circumference divided into a multiple of 2 at equiangular intervals and includes a plurality of divided areas having an entire circumference divided into the same number as the number of magnetized areas at equiangular intervals, the two adjacent magnetized areas have different polarities, in an inner circumferential surface of each divided area in the drive magnet, a distance from a rotation center line of the rotor becomes longer from a center in a circumferential direction toward both ends of the divided area, and a magnetization polarization line of the two adjacent magnetized areas deviates from a boundary between the two adjacent divided areas in the circumferential direction.

DESCRIPTION OF THE EMBODIMENTS

It is desirable to provide a motor with a permanent magnet that can be easily magnetized while reducing cogging torque.

According to the disclosure, the inner circumferential surface of each divided area in the annular drive magnet has a surface shape in which the distance from the rotation center line of the rotor becomes longer from the center in the circumferential direction toward both ends of the area, and the magnetization polarization line of the two adjacent magnetized areas deviates from the boundary of the two adjacent divided areas in the circumferential direction. According to this configuration, cogging torque of the motor can be reduced due to a difference between change in magnetic flux density in each divided area in the circumferential direction and change in the gap between each divided area and the rotor in the circumferential direction. In addition, according to the configuration, the annular drive magnet can be easily magnetized since there is no need for skew magnetization.

An embodiment of a motor to which the disclosure is applied will be described below with reference to the drawings.

Figure 1:
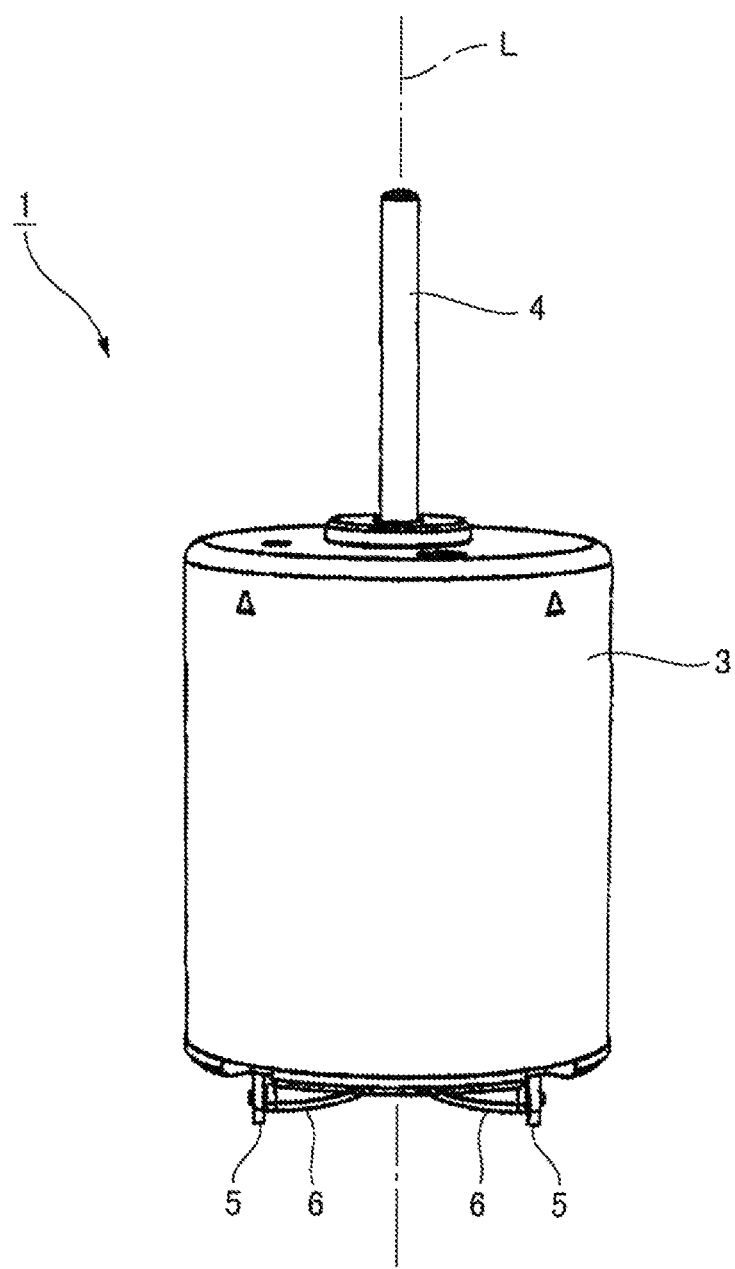
FIG. 1 is a perspective view of an appearance of a motor.
Figure 2:
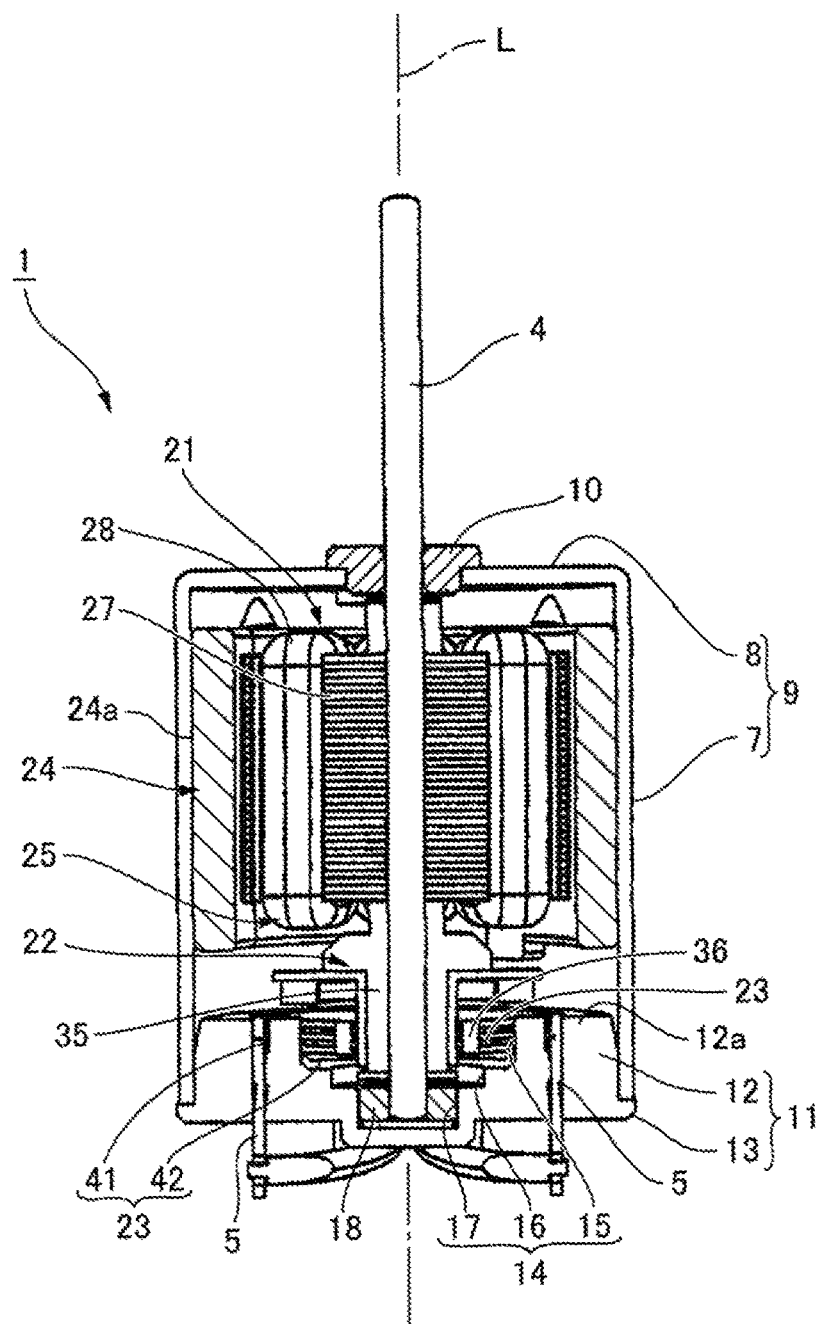
FIG. 2 is a cross-sectional view of the motor cut along an axis of rotation.
Figure 3:
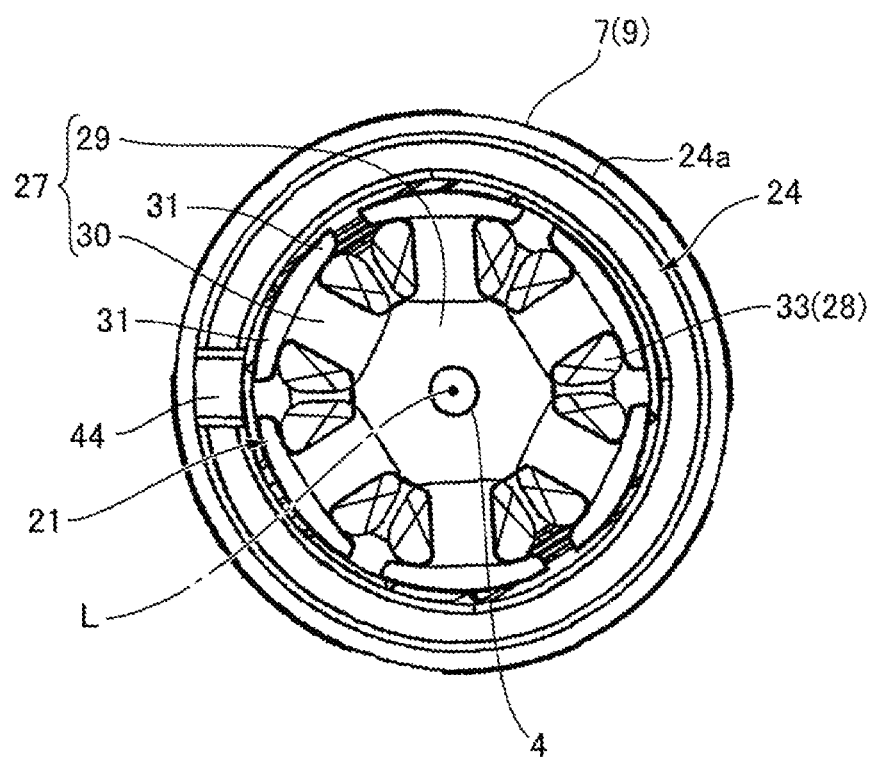
FIG. 3 is a cross-sectional view of the motor cut perpendicularly to the axis of rotation.
Figure 4:
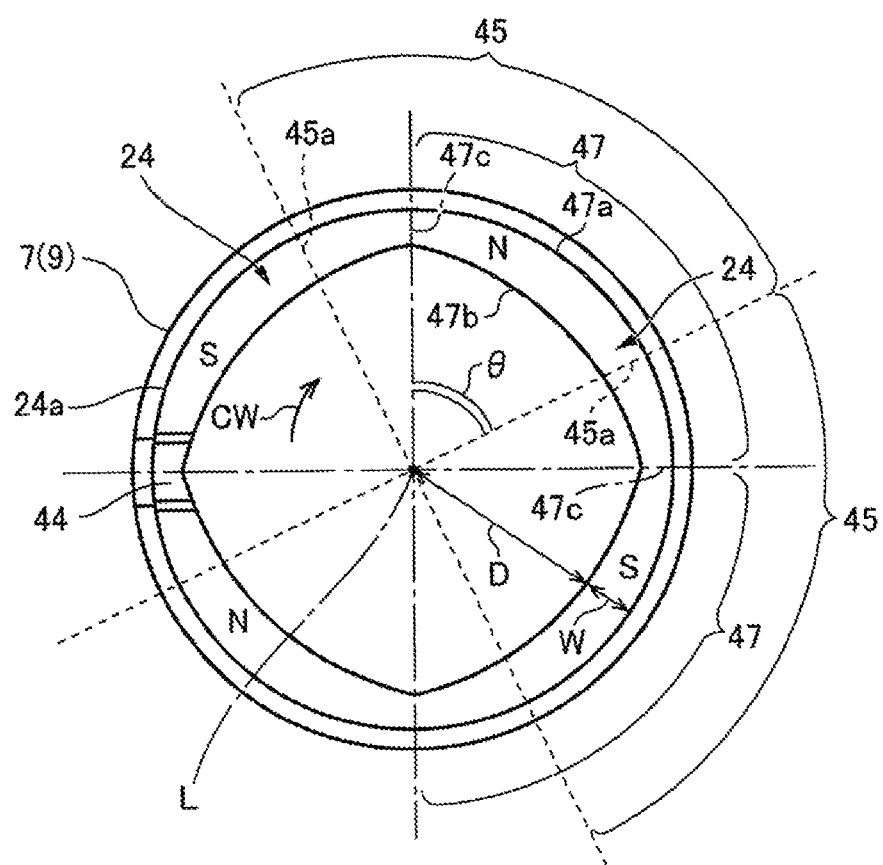
FIG. 4 is an explanatory diagram of a drive magnet.

FIG. 1 is a perspective view of an appearance of a motor. In FIG. 1, the motor is viewed from an output side on which an axis of rotation protrudes. FIG. 2 is a cross-sectional view of the motor cut along the axis of rotation. FIG. 3 is a cross-sectional view of the motor cut perpendicularly to the axis of rotation. In FIG. 3, the cut surface of the motor is viewed from the anti-output side. FIG. 4 is an explanatory diagram of a drive magnet.

The motor 1 of the disclosure is a brushed motor. The motor 1 includes a cylindrical motor housing 3, a rotation shaft 4 protruding to one side from the motor housing 3, and two terminal pins 5 protruding to the other side from the motor housing 3 as illustrated in FIG. 1. Each of the two terminal pins 5 is connected to a lead wire 6. A direction along an axial line L of the rotation shaft 4 will be referred to as an axial direction X in the description below. In addition, the direction in which the rotation shaft 4 protrudes from the motor housing 3 will be referred to as a first direction X1 of the axial direction X, and the direction in which the two terminal pins 5 protrude will be referred to as a second direction X2 of the axial direction X. The first direction X1 is the output side of the motor 1, and the second direction X2 is the anti-output side of the motor 1. In addition, a circumferential direction is a direction around the axial line L, and a radial direction is a direction centered on the axial line L in the description below.

The motor housing 3 includes a housing member 9 having a tube part 7 extending coaxially with the axial line L and an annular plate part 8 extending from an end of the tube part 7 in the first direction X1 to an inner circumferential side as illustrated in FIG. 2. An output side bearing 10 is mounted in a center hole of the plate part 8. The output side bearing 10 supports the center part of the rotation shaft 4 in the axial direction X to be capable of rotating.

In addition, the motor housing 3 includes a sealing member 11 sealing an opening of the tube part 7 in the second direction X2. The sealing member 11 includes a disk part 12 inserted into the tube part 7 and an annular flange part 13 protruding from an end part of the disk part 12 in the second direction X2 to an outer circumferential side. The disk part 12 includes a circular concave part 14 at the center in the first direction X1. The concave part 14 includes a large-diameter concave part 15, a medium-diameter concave part 16 having a smaller inner diameter than the large-diameter concave part 15, and a small-diameter concave part 17 having a smaller inner diameter than the medium-diameter concave part 16.

An anti-output side bearing 18 is provided inside the small-diameter concave part 17. The anti-output side bearing 18 is positioned coaxially with the output side bearing 10. The anti-output side bearing 18 supports the end of the rotation shaft 4 in the second direction X2 to be capable of rotating. The two terminal pins 5 are fixed to an outer circumferential part 12a of the disk part 12 positioned on an outer circumferential side of the concave part 14. The two terminal pins 5 are positioned on both sides having the concave part 14 therebetween. The annular flange part 13 abuts the annular end surface of the tube part 7 in the second direction X2.

A rotor body 21, a commutator unit 22, a pair of brushes 23, and a drive magnet 24 are housed inside the motor housing 3. The rotor body 21 and the commutator unit 22 are fixed to the rotation shaft 4. Thus, the rotor body 21 and the commutator unit 22 rotate integrally with the rotation shaft 4. The rotation shaft 4, the rotor body 21, and the commutator unit 22 form a rotor 25 of the motor 1.

The rotor body 21 includes a rotor core 27 and a drive coil 28 wound around the rotor core 27. The rotor core 27 is a laminated core formed by laminating a plurality of plate members formed of a magnetic material in the axial direction X. The rotor core 27 includes an annular part 29 including a center hole allowing the rotation shaft 4 to pass therethrough and six salient pole parts 30 protruding outward in a radial direction from the annular part 29 as illustrated in FIG. 3. The rotor core 27 is fixed to the rotation shaft 4, allowing the rotation shaft 4 to pass through the center hole of the annular part 29.

Each of the salient pole parts 30 includes a pair of extension parts 31 extending from an end on an outer circumferential side on one side and the other side of the circumferential direction. Outer circumferential surfaces of the salient pole parts 30 and outer circumferential surfaces of the pair of extension parts 31 facing outward in the radial direction are arc surfaces that are continuous in the circumferential direction without a step. Shapes of the salient pole parts 30 and the pair of extension parts 31 viewed in the axial direction X are arc shapes centered on the axial line L. The drive coil 28 includes six coils 33 wound around each of the salient pole parts 30. Each of the coils 33 is wound between the annular part 29 and the pair of extension parts 31.

The commutator unit 22 is disposed in the rotor body 21 in the second direction X2 and fixed to the rotation shaft 4 as illustrated in FIG. 2. The commutator unit 22 includes an annular holder 35 fixed to the rotation shaft 4 and six commutators 36 fixed to an outer circumferential surface of the holder 35. The six commutators 36 are disposed around the axial line L at equiangular intervals. More specifically, each of the commutators 36 is disposed at an angle position at which centers of two adjacent salient pole parts 30 in the circumferential direction are positioned. A shape of each commutator 36 viewed in the axial direction X is an arc shape centered on the axial line L. Each of the commutators 36 is connected to two adjacent coils 33 in the circumferential direction. That is, each of the commutators 36 is connected to an end of the line of one coil 33 of two adjacent coils 33 and an end of the line of the other coil 33.

The pair of brushes 23 are supported by the sealing member 11. The pair of brushes 23 are positioned on both sides having the concave part 14 therebetween. Each of the brushes 23 includes a fixed part 41 that is fixed to the outer circumferential part 12a of the concave part 14 of the disk part 12 and electrically connected to each terminal pin 5 and a protruding part 42 protruding from the outer circumferential part 12a to an inner side of the large-diameter concave part 15. The protruding part 42 extends in a direction intersecting the radial direction toward an inner circumferential side in the large-diameter concave part 15. The protruding part 42 has elasticity that enables the protruding part to bend to an outer circumferential side. The protruding part 42 of one brush 23 and the protruding part 42 of the other brush 23 extend in directions orthogonal to each other when viewed in the axial direction X.

Here, the commutators 36 are positioned on an inner circumferential side of the large-diameter concave part 15 of the sealing member 11 when the rotation shaft 4 with the rotor body 21 and the commutator unit 22 fixed thereto is supported by the output side bearing 10 and the anti-output side bearing 18. In addition, an end portion of the protruding part 42 of each brush 23 on the inner circumferential side comes in contact with the commutators 36, having elasticity.

The drive magnet 24 is fixed to an inner circumferential surface of the tube part 7 of the housing member 9. The drive magnet 24 has an annular shape and surrounds the rotor body 21 from an outer circumferential side. The drive magnet 24 includes a rectangular projection 44 projecting in the second direction X2 at one portion in the circumferential direction as illustrated in FIG. 3. The projection 44 is used to position the drive magnet 24 in the circumferential direction and the like. The drive magnet 24 includes a plurality of magnetized areas 45 having an entire circumference divided into a multiple of 2 at equiangular intervals as illustrated in FIG. 4. In this example, four magnetized areas 45 are provided. Two adjacent magnetized areas 45 have different polarities. In this example, an outer circumferential surface 24a of the drive magnet 24 has a circular shape.

The motor 1 receives supply of DC power via the two terminal pins 5. The rotor 25 starts rotating when electric power is supplied. In addition, in the motor 1, the rotor 25 continuously rotates by changing a direction of a current flowing in the drive coil 28 in accordance with a rotation phase due to contact of the rotating commutators 36 and the brushes 23.

(Details of Drive Magnet)

Figure 5:
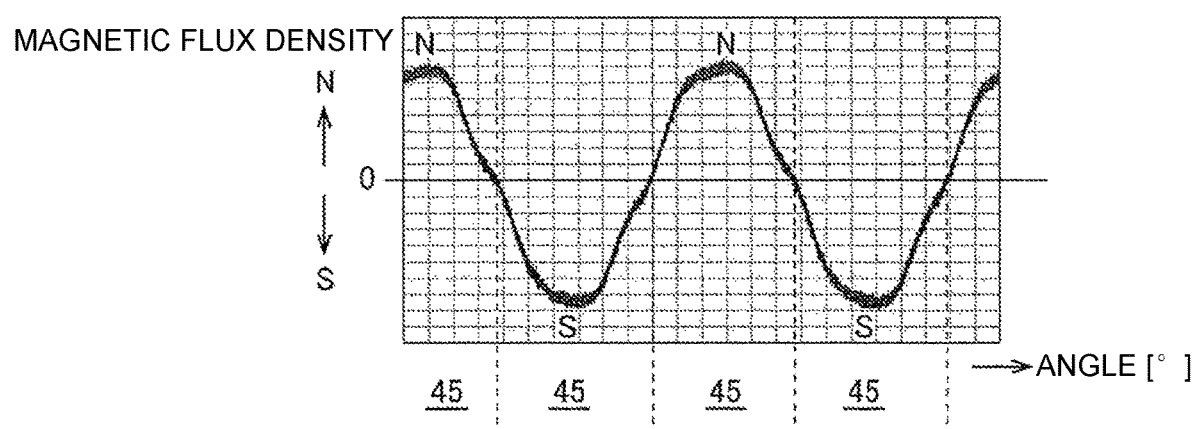
FIG. 5 is an explanatory diagram showing a magnetization waveform of the drive magnet.
Figure 6:
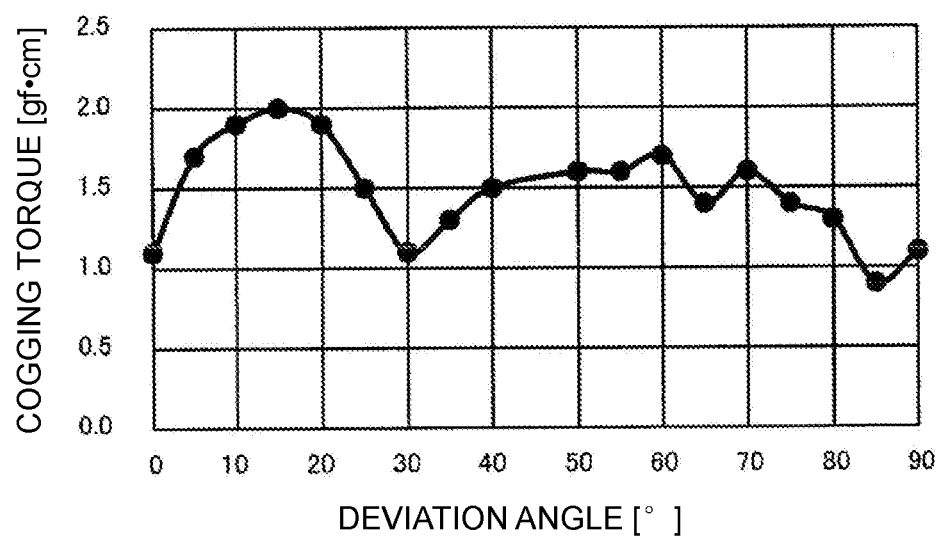
FIG. 6 is an explanatory diagram showing a relation between a deviation angle formed by a magnetization polarization line of magnetized areas and a boundary between divided areas and cogging torque of the motor.

Next, the drive magnet will be described in more detail with reference to FIG. 4. FIG. 4 illustrates a shape of the drive magnet 24 with exaggerated characteristics of the shape for the sake of easy understanding. FIG. 5 is an explanatory diagram showing a magnetization waveform of the drive magnet 24. FIG. 6 is an explanatory diagram showing a relation between a deviation angle formed by a magnetization polarization line of magnetized areas 45 and a boundary between divided areas and cogging torque of the motor 1.

The drive magnet 24 includes a plurality of magnetized areas 45 having an entire circumference divided into a multiple of 2 at equiangular intervals and includes a plurality of divided areas 47 having an entire circumference divided into the same number as the number of magnetized areas 45 at equiangular intervals. In this example, four magnetized areas 45 and four divided areas 47 are provided. An outer circumferential surface 47a of the divided areas 47 in the drive magnet 24 has an arc shape centered on the axial line L as illustrated in FIG. 4. In an inner circumferential surface 47b of each divided area 47 in the drive magnet 24, a distance D from the axial line L (rotation center line) of the rotor 25 becomes longer from the center in the circumferential direction toward both ends of the area. Thus, a thickness W of each divided area 47 in the radial direction becomes thinner from a center portion in the circumferential direction to both ends of the area in the circumferential direction. A magnetization waveform of the drive magnet 24 has a highest magnetic flux density at the center of each magnetized area 45 in the circumferential direction and a decreasing magnetic flux density toward both ends of the area as illustrated in FIG. 5.

Here, a magnetization polarization line 45a of two adjacent magnetized areas 45 deviates from a boundary 47c of two adjacent divided areas 47 in the circumferential direction as illustrated in FIG. 4. In this example, the magnetization polarization line 45a deviates 85 degrees clockwise CW from the boundary 47c of the divided areas 47 when viewed in the second direction X2 (from the anti-output side). A deviation angle θ by which the magnetization polarization line 45a of the magnetized areas 45 deviates from the boundary 47c of the divided areas 47 is set based on an experiment. That is, a plurality of motors 1 including drive magnets 24 with different deviation angles θ was manufactured, and an experiment was performed to measure cogging torque of each of the motors 1. Then, the deviation angles θ were set on the basis of the measured cogging torque. The motor 1 has the lowest cogging torque when the deviation angle θ is set to 85 degrees as illustrated in FIG. 6.

Figure 7:
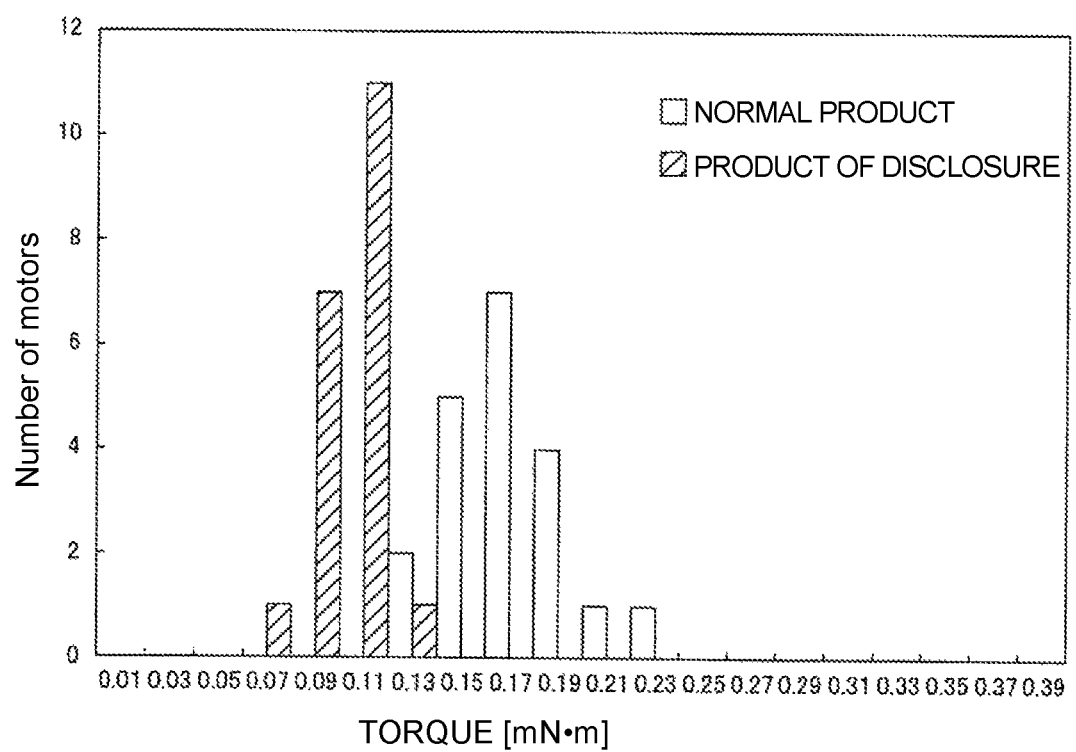
FIG. 7 is an explanatory diagram of test results showing comparison of cogging torque of the motor of the disclosure with cogging torque of a normal motor.

FIG. 7 is an explanatory diagram of test results showing comparison of cogging torque of the motor 1 of the disclosure with cogging torque of a normal motor. The normal motor is a motor with a ring-shaped drive magnet having a constant thickness, instead of the drive magnet 24. The drive magnet of the normal motor includes four magnetized areas. In the test, 20 motors 1 of the disclosure were prepared, and cogging torque of each motor 1 was measured. In addition, 20 normal motors were prepared, and cogging torque of each motor was measured. The motors 1 of the disclosure apparently showed low cogging torque in comparison to the normal motors as illustrated in FIG. 7.

That is, in the motors 1 of the disclosure, the inner circumferential surface 47b of each divided area 47 in the annular drive magnet 24 has a surface shape in which a distance from the rotation center line of the rotor 25 becomes longer from the center in the circumferential direction toward both ends of the area, and the magnetization polarization line 45a of two adjacent magnetized areas 45 deviates from the boundary 47c of two adjacent divided areas 47 in the circumferential direction. With this configuration, cogging torque can be reduced due to a difference between change in magnetic flux density in each divided area 47 in the circumferential direction and change in the gap between each divided area 46 and the rotor 25 in the circumferential direction. In addition, with this configuration, there is no need to have skew magnetization, and thus magnetization of the annular drive magnet 24 is easier. Therefore, the motor 1 is suitable for mass production.

(Modified Example)

Although the motor 1 is a brushed motor in the above-described example, it is a matter of course that the disclosure can be applied to brushless motors.

Further, the number of magnetized areas 45 and divided areas 47 of the drive magnet 24 is not limited to 4 and may be a multiple of 2. In addition, the number of salient pole parts 30 of the rotor 25, that is, the number of coils 33, is not limited to 6 and may be a multiple of 3.

What is claimed is:

1. A motor comprising:
a rotor; and
an annular drive magnet surrounding the rotor,
wherein the drive magnet comprise a plurality of magnetized areas having an entire circumference divided into a multiple of 2 at an equiangular interval and comprises a plurality of divided areas having the entire circumference divided into a same number as the number of magnetized areas at an equiangular interval,
wherein each two adjacent magnetized areas have different polarities,
wherein, on an inner circumferential surface of each divided area in the drive magnet, a distance from a rotation center line of the rotor becomes longer from a center in a circumferential direction toward both ends of the divided area,
wherein a magnetization polarization line of two adjacent magnetized areas deviates from a boundary between each two adjacent divided areas in the circumferential direction, and
wherein the magnetization polarization line deviates from each of two adjacent boundaries with different angles.

2. The motor according to claim 1, wherein an outer circumferential surface of the drive magnet has a circular shape.

3. The motor according to claim 1, wherein a thickness of each of the divided areas in a radial direction becomes thinner from a center portion in the circumferential direction toward both ends of the divided area in the circumferential direction.

4. The motor according to claim 2, wherein a thickness of each of the divided areas in a radial direction becomes thinner from a center portion in the circumferential direction toward both ends of the divided area in the circumferential direction.

5. The motor according to claim 1, wherein the rotor comprises a core having a multiple of 3 salient poles extending in the radial direction at an equiangular interval and drive coils wound around each of the salient poles.

6. The motor according to claim 2, wherein the rotor comprises a core having a multiple of 3 salient poles extending in the radial direction at an equiangular interval and drive coils wound around each of the salient poles.

7. The motor according to claim 3, wherein the rotor comprises a core having a multiple of 3 salient poles extending in the radial direction at an equiangular interval and drive coils wound around each of the salient poles.

8. The motor according to claim 4, wherein the rotor comprises a core having a multiple of 3 salient poles extending in the radial direction at an equiangular interval and drive coils wound around each of the salient poles.

9. The motor according to claim 5,
wherein the core comprises six salient poles, and
wherein the drive magnet comprises four magnetized areas.

10. The motor according to claim 6,
wherein the core comprises six salient poles, and
wherein the drive magnet comprises four magnetized areas.

11. The motor according to claim 7,
wherein the core comprises six salient poles, and
wherein the drive magnet comprises four magnetized areas.

12. The motor according to claim 8,
wherein the core comprises six salient poles, and
wherein the drive magnet comprises four magnetized areas.

* * * * *